United States Patent [19]

Reali et al.

[11] Patent Number: 5,408,846
[45] Date of Patent: Apr. 25, 1995

[54] APPARATUS FOR PREPARING RUBBER AND OTHER MATERIALS FOR RECYCLING

[75] Inventors: Angelo Reali, Manhasset Hills; Igor Reznik; Iosif Khais, both of Brooklyn, all of N.Y.

[73] Assignee: Crumbrubber Technology Company, Inc., Jamaica, N.Y.

[21] Appl. No.: 197,944

[22] Filed: Feb. 17, 1994

[51] Int. Cl.⁶ .................... F25D 25/02; F25D 9/00
[52] U.S. Cl. ............................... 62/381; 62/63; 62/380; 62/401
[58] Field of Search ............ 62/63, 380, 381, 401

[56] References Cited

U.S. PATENT DOCUMENTS

| | | | |
|---|---|---|---|
| 2,494,296 | 1/1950 | Gunther et al. | 62/63 |
| 3,804,339 | 4/1974 | Laws et al. | 62/63 X |
| 3,992,899 | 11/1976 | Spahn | 62/381 X |
| 4,072,026 | 2/1978 | Oberpriller | 62/63 |
| 4,084,387 | 4/1978 | Schorsch et al. | 62/63 |
| 4,116,017 | 9/1978 | Oberpriller | 62/62 |
| 4,124,997 | 11/1978 | Sadjina et al. | 62/381 X |
| 4,175,396 | 11/1979 | Miller et al. | 62/63 |
| 4,607,796 | 8/1986 | Enikolopov et al. | |
| 4,625,922 | 12/1986 | Brubaker et al. | |
| 4,726,530 | 2/1988 | Miller et al. | |
| 5,005,377 | 4/1991 | Tucek et al. | 62/381 X |
| 5,024,386 | 6/1991 | Morris | |
| 5,115,983 | 5/1992 | Rutherford, Sr. | |
| 5,238,194 | 8/1993 | Rouse et al. | |

*Primary Examiner*—Christopher Kilner
*Attorney, Agent, or Firm*—Collard & Roe

[57] ABSTRACT

There is provided a cooling device for lowering the temperature of rubber or polystyrene materials for recycling purposes. The cooling device has an input feeder which inputs the material to be treated into a cooling chamber. The cooling chamber is an elongated chamber. The cooling chamber receives cold air from an external air refrigeration unit and circulates that air within the chamber. The material input into the cooling chamber is circulated therein by a circulating shaft. After 15–20 minutes, the input material is discharged through an output on the opposite end of the cooling chamber. The temperature of the material discharged is −80° C. or lower.

17 Claims, 3 Drawing Sheets

APPARATUS FOR PREPARING RUBBER AND OTHER MATERIALS FOR RECYCLING

BACKGROUND OF THE INVENTION

Field of the Invention

The present invention relates to the recycling of waste material. More particularly, it relates to the processing of polystyrene or vulcanized materials for recycling into a reusable substance.

The increasing production of industrial rubber goods, tires and other polystyrene products has resulted in the accumulation of large quantities of rubber and polymeric waste materials which find no practical application. In the United States alone, over 200 million tires are discarded each year.

Several methods that break down rubber and other polystyrene matter into a reusable material has been shown. Where cryogenic destruction is used, the rubber or other material can be pulverized for recycling.

Presently, the cryogenic recycling processes require the use of liquid nitrogen or solid carbon dioxide to lower the temperature of the material to be recycled to a point where a subsequent impact or cutting produces a powder. These cryogenic processes are very expensive to implement due to the need for a large plant for liquid nitrogen or solid carbon dioxide production. Thus, the present cryogenic processes are uneconomical in view of the large amount of rubber and polystyrene waste currently produced.

The Prior Art

The patent to Enikopolov et al, U.S. Pat. No. 4,607,796, discloses a method of making powder from rubber and vulcanization products. This inventive process includes compression to allow for greater pulverization. The material is then cooled to a temperature in a range of 15° C. to 60° C. under pressure and shear conditions. In addition, the pulverization process can be done in the presence of a polyethylene additive to improve the degree of comminution.

The patent to Rouse et al., U.S. Pat. No. 5,238,194, discloses a method of producing fine elastomeric or rubber particles. This process involves the following steps: First, establishing an excessive flow of water through an open set of non-rotating grinding stones. Second, the stones are rotated at full speed until a desired pressure of closure is achieved. Then the grinding mill is fed with a slurry of carrier liquid and the material which is then ground while closing the water flow used to establish the flow rate. The energy expended in rotating the grinding stones is dissipated into the slurry as heat.

The patent to Rutherford Sr., U.S. Pat. No. 5,115,983, discloses a process for recycling vehicle tires. The process consists of shredding the rubber from a tire while separating the shredded rubber from the cording and beading material of the tire. This process is performed by placing the tire in a chamber and subjecting the tire to high pressure water jets. Water fired from the water jets hits the tire at a pressure of at least 2000 psi not to exceed 10,000 psi. Exposing the tire to the pressurized water streams for a predetermined period of time, the rubber is shredded from the tire and the cording and beading are separated therefrom.

U.S. Pat. No. 4,726,530 to Miller et al., discloses a method of resource recovery from used tires. This process involves shredding tires into small pieces, screening the shredded pieces, reshredding and rescreening the pieces. Then, the pieces of tires are granulated to the desired size. Finally, the material is separated through the use of an air separator and a magnetic separator.

The patent to Morris, U.S. Pat. No. 5,024,386 discloses a tire converting apparatus and method. This method starts by debeading the tire, and cutting the tire into two segments. The sidewalls of the cut segment are spread apart and then the segment is held flat, finally the flat segment is finally fed into a shredder and the shredded pieces are then recovered for further use.

The Patent to Brubaker et al, U.S. Pat. No. 4,625,922 discloses an elevated temperature comminution of vulcanized rubber and other elastomers. The invention consists of reducing the viscosity of the slurry before it is fed into the commuting zone. This involves heating the pellets into a slurry at 130° F. by either vibration or hot water.

SUMMARY OF THE INVENTION

In accordance with the invention, there is provided a cooling chamber for lowering the temperature of rubber or other polystyrene materials to cryogenic levels without the use of liquid nitrogen or any other chemical aids. The cooling chamber has an input feeder which automatically feeds the material to be recycled into one end of the cooling chamber. The chamber is elongated and has U-shape cross section. A centrally disposed shaft is mounted in the chamber to circulate the material in the chamber.

The cooling device has a refrigeration input opening at its output end, and a refrigeration return at its input end. The circulating shaft, has a plurality of paddles disposed perpendicularly thereon to circulate the material as the cool air moves through the cooling chamber. The paddles extend from the input end of the cooling chamber, across most of the length of the shaft. The remaining portion of the circulating shaft has a helical screw disposed thereon. When rotated, the helical screw forces the now cooled material from the cooling chamber out of its output opening.

In the preferred embodiment, the rubber or polystyrene material is introduced into the cooling chamber, and is circulated therethrough for about 15–20 minutes. As the material nears the output of the chamber, it has been cooled to a temperature lower than −80° C. Upon discharge from the cooling chamber, the super cooled material may be pulverized and recycled.

It is therefore an object of the present invention to provide a cooling device for cooling rubber and other products for further recycling.

Another object of the invention is to provide a cooling chamber capable of reaching cryogenic temperatures without the use of liquid nitrogen or other chemical elements.

Still another object of the invention is to provide a cooling chamber capable of reaching cryogenic temperatures efficiently, effectively and reliably, without the use of liquid nitrogen or the like.

BRIEF DESCRIPTION OF THE DRAWINGS

Other objects and features of the present invention will become apparent from the following detailed description considered in connection with the accompanying drawings which discloses the embodiments of the present invention. It should be understood, however, that the drawings are designed for the purpose of illustration only and not as a definition of the limits of the invention.

In the drawings, wherein similar reference characters denote similar elements throughout the several views.

DETAILED DESCRIPTION OF PREFERRED EMBODIMENTS

Figure 1:
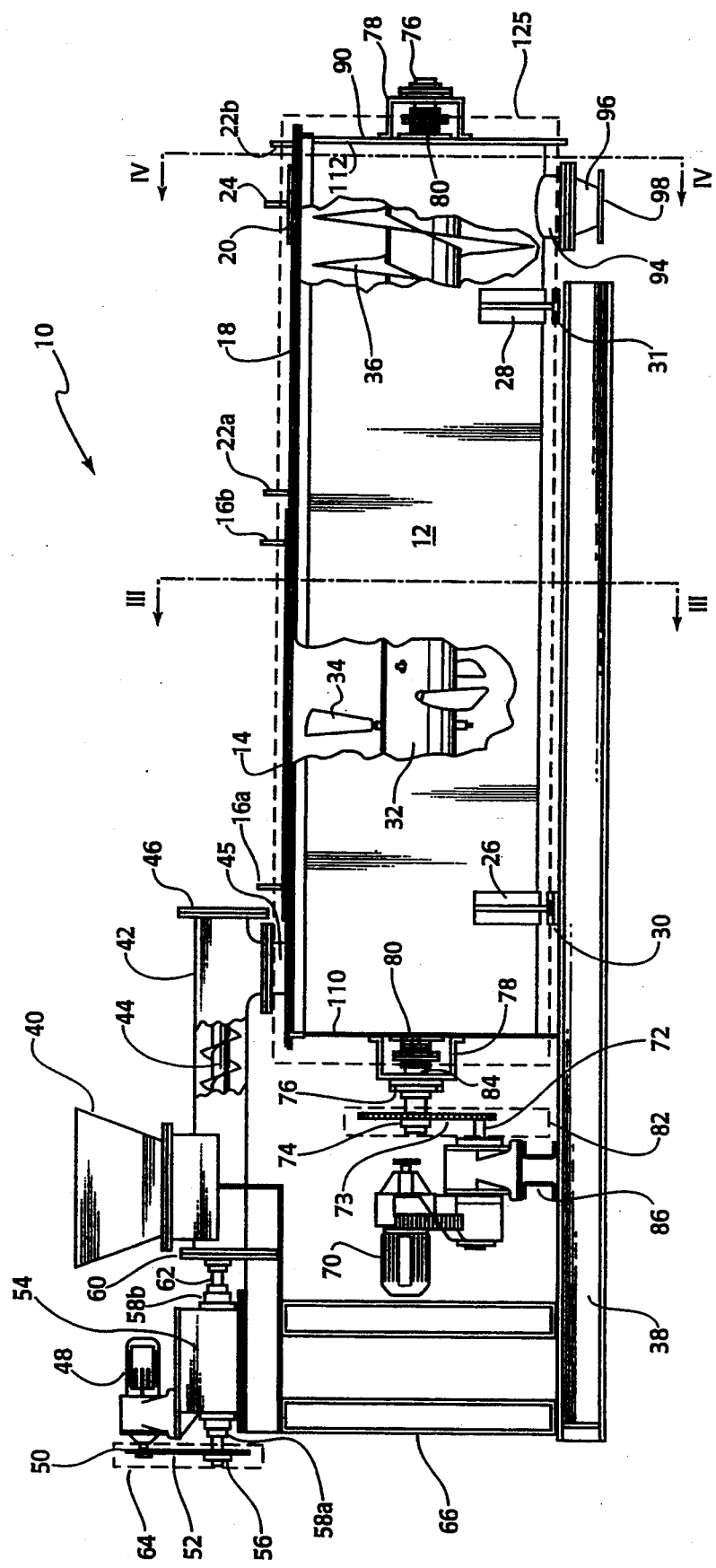
FIG. 1 is a front elevational view partly in cross-section, of an embodiment of the cooling device of the present invention.

Turning now in detail to the drawings, FIG. 1 shows a front elevation view of the cooling device 10 of the invention. An input hopper 40 receives the material to be cooled and funnels it into sealed feeder pipe housing 42. Input helical screw 44, having a diameter slightly less then that of pipe housing 42, is axially disposed within pipe housing 42 and moves the material along pipe housing 42 until it falls into input 45 of cooling chamber 12. Pipe housing 42 has a removable end plate 46 for maintenance, near the input end 45 of cooling chamber 12. Helical screw 44 has a drive shaft 62 that extends through end plate 60 of pipe housing 42. End plate 60 is disposed at the input end 40 of pipe housing 42. Drive shaft 62 is driven by gear motor 48. Sprocket 50 of gear motor 48 is coupled to a roller chain 52 which is also coupled to sprocket 56 of flange block bearing 58a. A chain guard 64 covers roller chain 52 and sprockets 50 and 56. Flange block bearing 58a is coupled to the first end of bearing and gear motor support 54. The second opposite end of bearing and gear motor support 54 is coupled through flange block bearing 58b to drive shaft 62 of helical screw 44. Helical screw 44 and seal pipe housing 42 are preferably constructed of stainless steel or other well known metal capable of withstanding the frigid temperatures within the cooling chamber 12.

The cooling chamber 12 is an elongated chamber, having a circulating shaft 32 coaxially disposed therein. Circulating shaft 32 his coupled to a drive shaft 8,4 extending through input end 110 of cooling chamber 12. Circulating shaft 32 is driven by gear motor 70. Gear motor 70 drives a sprocket 72, which is connected to a sprocket 74 through a roller chain 73, so as to rotate drive shaft 84 of circulating shaft 32. Drive shaft 84 has a shaft rider seal 80 and a flange block bearing 76 disposed on the outside of cooling chamber 12 and supported by a bearing support 78. A chain guard 82 protects roller chain 73 and sprockets 72 and 74.

Cooling chamber 12 includes top cover plates 14 and 18 which are gasketed and bolted down during operation. Cover plates 14 and 18 allow access to the interior of cooling chamber 12. Cover plate 18 also has an inspection port 24 disposed above the output 94 of cooling chamber 12 for inspecting the output flow of material within cooling chamber 12. Cooling chamber 12 is entirely surrounded by insulation 125. Insulation 125 is 4 inches thick and has an insulation rating between R-20 and R-30.

Circulating shaft 32 is divided into two sections. The first section has a plurality of paddles 34, radially extending from the shaft to the inner walls of the chamber. Paddles 34 circulate the contained material within cooling chamber 12. The paddles 34 are adjustable in order to change the rate of flow of material within said chamber. The first section of paddles 34 extend from input end 110 of cooling chamber 12 to at least half the length of circulating shaft 32. The remaining portion of circulating shaft 32, extending from the end of said paddle section (first section) to the output end 112 of cooling chamber 12, comprises the second section. The second section of circulating shaft 32 is designed as a helical screw 36. In the preferred embodiment, the screw is at least 12 inches in length along circulating shaft 32. Helical screw 36 mounted on circulating shaft 32 is disposed above the output opening 94 and forces the material within cooling chamber 12 out the output opening 94 using gravity. Chamber supports 26 and 28 secure the cooling chamber 12 on a flat surface. Metal sheet pads 30 and 31, disposed beneath chamber supports 26 and 28, respectively, cushion said supports from the flat surface on which cooling chamber 12 is mounted.

Figure 2:
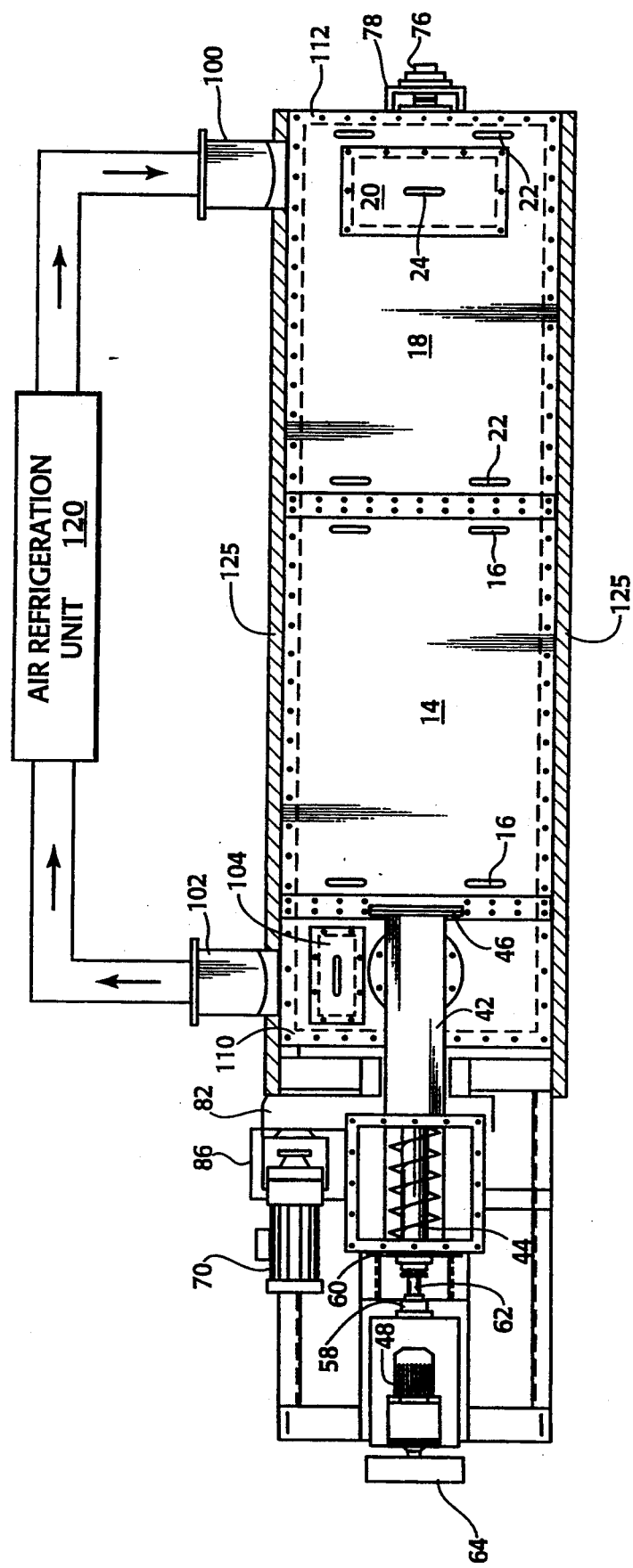
FIG. 2 is a top view of the cooling device of FIG. 1.

Referring to FIG. 2, a top view of the cooling device 10 of the invention is shown. Cold air input 100 feeds cold air from an air cycle refrigeration unit 120, having a temperature of 0° C. or less, at the material output end 112 of cooling chamber 12. A cold air return 102, disposed at input end 110 of cooling chamber 12, collects the cold air, after it has circulated through cooling chamber 12. The cold air flow, within chamber 12, is countercurrent to the flow of material within chamber 12. As can be seen more clearly, cover plates 14 and 18 completely cover cooling chamber 12. Inspection port 20 allows an inspection of the continuous discharge output of cooling device 10. A second inspection port 104 allows an inspection of the continuous flow of material at the input end 110 of cooling chamber 12. Cover plates 14 and 18 are gasketed and bolted down during operation of cooling device 10.

Figure 3:
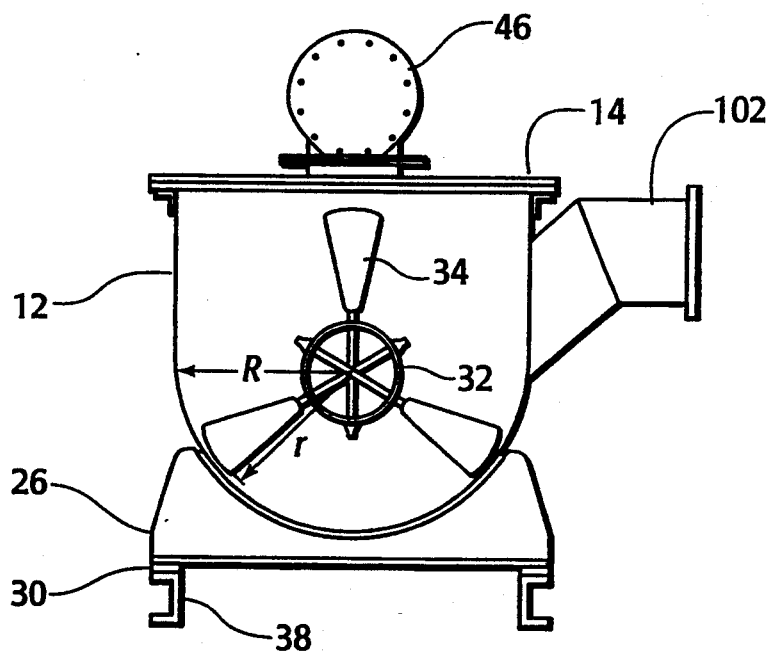
FIG. 3 is a cross sectional view of the cooling device of FIG. 1, taken along line III—III of FIG. 1.

FIG. 3 is a cross section of the cooling chamber 12 of FIG. 1, taken along line III—III of FIG. 1. Circulating shaft 32 is shown coaxially disposed within cooling chamber 12. Paddles 34 are radially disposed along circulating shaft 32 in perpendicular relation thereto. The paddles 34, in conjunction with circulating shaft 32, have a radius "r" slightly smaller than the radius "R" of cooling chamber 12 such that they rotate freely within said cooling chamber. Cold air duct 102 is the return duct of the circulated cold air within cooling chamber 12. Chamber support 26 maintains the cooling chamber 12 in an upright position when disposed on a flat surface. Metal sheet pads 30, disposed between structure supports 38 and chamber support 26, cushion the chamber support 26 and prevent the chamber 12 from sliding. The paddles 34 and circulating shaft 32 are preferably made of stainless steel, or other suitable metal such as, for example, copper or brass, that can withstand the extreme cold temperatures used in the cooling chamber 12.

Figure 4:
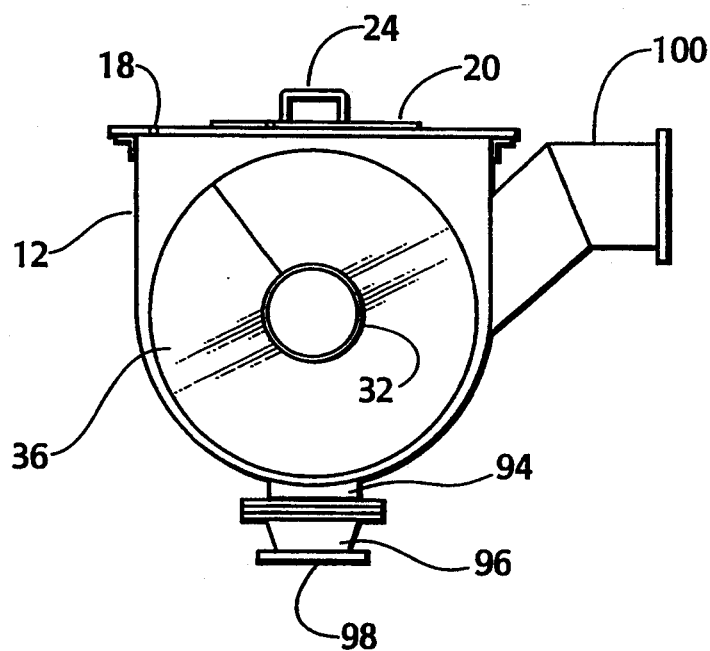
FIG. 4 is a cross sectional view of the cooling device of FIG. 1, taken along the line IV—IV of FIG. 1.

FIG. 4 is a cross section of the cooling chamber 12 of FIG. 1, taken along the line IV-IV of FIG. 1 adjacent to the output opening 94 of the chamber. Here, circulating shaft 32 has helical screw 36 disposed thereon. Helical screw 36 has a radius "r" only slightly smaller than the radius "R" of cooling chamber 12, such that said helical screw can rotate freely within cooling chamber 12. Output opening 94 is disposed below helical screw 36. A funnel shaped reducer 96 is coupled to output 94 to reduce the discharge 98 from output 94. Cold air duct 100 feeds cold air from an air refrigeration unit 120 (FIG. 2), into cooling chamber 12 at the output end 112 cooling chamber 12. Helical screw 36 is preferably made of stainless steel or other metal capable of withstanding the cold temperatures of the refrigeration chamber.

In operation, and referring to FIGS. 1 and 2, rubber or other material is first shredded into small chunks, preferably 2"×2", and then fed into input hopper 40. Input helical screw 44 continuously carries the material within sealed feeder pipe housing 42 until it falls into input opening 45 of cooling chamber 12. Cold air, from an external air refrigeration unit 120, is fed into cooling chamber 12 through cold air input 100 at the output end 112 of the chamber. The cold air then flows across the chamber and against the continuous flow of material. It is this countercurrent flow of cold air with respect to the material flow within chamber 12 that assures the material will be at its coldest temperature when discharged from output opening 94. In this configuration, the input cold air is at its least cool state when first coming into contact with the input material. Thus, as the flow of material is continuously forced against the flow of cold air, the material is consistently exposed to colder air as it approaches the output of the chamber. Gravity and the pressure of the input material, in addition to the action of the paddles 34 all contribute to move the material along within chamber 12. When finally reaching the output end 112 of chamber 12, the material is at its coldest temperature, due to the fact that the coldest air within in chamber 12 is at the cold air input 100 at the output end 112. Circulating shaft 32 rotates according to the progression of helical screw 36 (clockwise) such that said helical screw continuously forces the material toward output end 112 of cooling chamber 12. The paddles 34, on circulating shaft 32, circulate the rubber material against the flow of cold air flowing in cooling chamber 12, and aid in moving the material through said cooling chamber. As the height of the material within cooling chamber 12 builds up, the weight or pressure, together with the action of the paddles, causes the material to traverse along the length of said cooling chamber. After approximately 15–20 minutes, the first material, fed into the chamber 12 and now near the output opening 94, is discharged from output 94 and through discharge opening 98. The material has been cooled to a temperature of −80° C. or lower when it is finally discharged from cooling chamber 12. After the initial 15–20 minute period, the cooling device 10 will continuously produce material for further processing.

The gear motors 48 and 70, which drive the input helical screw 44 and circulating shaft 32, respectively, are adjustable in a range of 3–20 revolutions per minute. The entire cooling chamber 12, and its associated parts are preferably made of stainless steel or other metal capable of withstanding the cold temperatures within said chamber.

The cold air input 100 receives 4,000 cubic meters of cold air per hour having a temperature less than −80° C. from the external air refrigeration unit 120. The air refrigeration unit 120 consists of an electric motor, a turbo compressor having a turbo expander mounted on the same shaft, a first and second regenerator and a fan. The fan blows air through the first regenerator where the air temperature is reduced to −115° C. The cold air is then pumped into cooling chamber 12. At the air refrigeration return 102, the temperature of the air is approximately −85° C. The return air then goes through the turbo expander where it is expanded from 1 atmosphere to 0.5 atmosphere. The energy of the expanded air is then returned to the compressor, and the temperature of the air dips to −115° C. Now the −115° C. air is fed to the second regenerator. The second regenerator is then frozen by the air flowing therethrough. The air rises in temperature until reaching ambient temperature. The ambient air is the fed to the compressor where the pressure is raised from 0.5 to 1 atmosphere. The pressure increase in the air raises its temperature to +100° C. at which time it is exhausted from the system. The first and second regenerators alternately receive the cold air from the system and ambient air from outside. While the first regenerator is cooling, the second regenerator is receiving a flow of air having the ambient temperature and vice versa.

In a preferred embodiment of the invention, the chamber receives 4000 cubic meters per hour of chilled air between −90° to −130° C. The refrigeration unit used to produce the chilled air used approximately 90 kilowatts per hour and thus can chill each tire to brittle temperatures for about $0.12 per tire. Each tire weighs about 20 lbs. and contains approximately 5 lbs. of steel and 1 lbs. of fiber. The adjustable chamber paddles are driven by a five horse power electric motor and approximately ⅓ of a horse power is needed for the screw device. With a chamber approximately 40" in diameter and approximately 15' long it is possible to pulverize 175 tires per hour or approximately 3500 lbs. of material per hour.

After the output brittle material is pulverized, a powder is obtained having a screen size in a range of 20–200 mesh which translate to a powder having a size in a range of 86–1040 microns.

While a single embodiment of the present invention has been shown and described, it is to be understood that many changes and modifications may be made thereunto without departing from the spirit and scope of the invention as defined in the appended claims.

What is claimed is:

1. A continuous flow apparatus for preparing rubber or polystyrene materials for recycling comprising:
   an air cycle refrigeration unit for supplying refrigerated air;
   a cooling chamber for cooling the material until it becomes brittle by contact with the refrigerated air;
   an input feeder for feeding the material into the input of said cooling chamber, said input feeder having an input opening for receiving material and an output opening for discharging the material into said cooling chamber; and
   an output for discharging brittle material from said cooling chamber.

2. The apparatus of claim 1, wherein said cooling chamber further comprises a circulating means for circulating cool air within said chamber and moving means for moving material through said chamber.

3. The apparatus of claim 2, wherein said cooling chamber further comprises a shaft pivotally supported in said chamber,
   said circulating means comprising a plurality of paddles radially extending from the shaft, said moving means comprising a helical screw mounted on the shaft and disposed adjacent to the output for discharging brittle material.

4. The apparatus of claim 1, wherein said input feeder comprises:
   a helical screw drive for moving the material to the input of said chamber; and means for adjusting the speed of said screw drive to regulate the flow of material through said chamber.

5. The apparatus of claim 4, wherein said helical screw drive comprises:

an elongated cylindrical housing having a diameter, a first end, a spaced-apart second end, a top side and a bottom side, said input opening of said input feeder is disposed on said top side at said first end of the cylindrical housing, said output opening of said input feeder disposed on said bottom side at said spaced second end of the cylindrical housing; and a helical screw axially disposed within said cylindrical housing and extending from said first end to said spaced-apart second end of said cylindrical housing, said helical screw having a drive shaft extending through said first end of said cylindrical housing, said helical screw having a diameter slightly smaller than the diameter of said cylindrical housing such that said screw can rotate freely within said cylindrical housing.

6. The apparatus of claim 4, wherein said means for adjusting the speed of said drive comprises a first driving means coupled to said drive shaft of said helical screw, said first driving means for adjustably rotating said helical screw.

7. The apparatus of claim 6, wherein said means for adjusting the speed of said drive adjusts the speed in a range of 3-20 revolutions per minute.

8. The apparatus of claim 5, wherein said helical screw has threads extending from said first end to said spaced second end of said cylindrical housing for continuously carrying the material from said first end to said spaced second end of said cylindrical housing, said helical screw being made of stainless steel.

9. A continuous flow apparatus for preparing rubber or polystyrene materials for recycling comprising:

a cooling chamber for cooling the material until it becomes brittle;

an input feeder for feeding the material into the input of said cooling chamber, said input feeder having an input opening for receiving material and an output opening for discharging the material into said cooling chamber;

an output for discharging brittle material from said cooling chamber; and wherein said cooling chamber comprises:

an elongated hollow chamber having an input opening at a first end, and a discharge opening adjacent its opposite end, said input opening receiving the material to be recycled, and being disposed adjacent said output opening of said input feeder;

an output opening for discharging the recyclable material, said output opening being disposed adjacent to said opposite end of said chamber;

an air refrigeration input opening disposed adjacent to the opposite end of said chamber for cooling the material in said chamber;

a refrigeration return opening disposed adjacent to the first end of said chamber for discharging the circulated cold air form said chamber;

a circulating shaft axially disposed within said chamber and extending from said first end to said opposite end, said circulating shaft having a drive shaft extending through said first end of said chamber;

a second driving means coupled to said drive shaft of said circulating shaft, said second driving means for adjustably rotating said circulating shaft within said chamber; and insulation surrounding said chamber, said insulation having a thickness of at least 4 inches, said insulation having an "r" rating between 20 and 30.

10. The apparatus of claim 9, wherein said second driving means is adjustable in a range of 3-20 revolutions per minute.

11. The apparatus of claim 9, wherein said shaft includes a plurality of paddles radially disposed thereon, and a helical screw are affixed to said shaft, said paddles disposed along said shaft from said first end extending toward said opposite end of said chamber, said helical screw disposed on the remaining portion of said shaft and terminating at the opposite end of said chamber, said helical screw disposed above said output opening.

12. The apparatus of claim 10, wherein said paddles are disposed perpendicular to said circulating shaft, said paddles having a radius such that they can rotate freely within said chamber, said radius being slightly smaller than the radius of said chamber, said paddles circulating the flow of cool air from the refrigeration input opening through the material and aiding in moving the material through said chamber toward the output.

13. The apparatus of claim 10, wherein said helical screw has a radius slightly smaller than the radius of said chamber, said helical screw forcing the material out of said output opening.

14. The apparatus of claim 9, wherein said cooling chamber and said circulating shaft are made of stainless steel.

15. The apparatus of claim 10, wherein said paddles and said helical screw are made of stainless steel.

16. The apparatus of claim 9, wherein said circulating shaft has bearing members disposed at the first end and second end respectively of said chamber, said bearing members not disposed within said chamber.

17. The apparatus according to claim 9, wherein cold air is fed into said chamber through said air refrigeration input opening, said cold air being discharged from said chamber through said air refrigeration return, said cold air having a flow from said air refrigeration input opening to said air refrigeration return opening, said cold air flow being countercurrent to the material flow within said chamber.

* * * * *